US011165300B2

(12) United States Patent
Watanabe et al.

(10) Patent No.: US 11,165,300 B2
(45) Date of Patent: Nov. 2, 2021

(54) MOTOR STATOR

(71) Applicant: YAMADA MANUFACTURING CO., LTD., Kiryu (JP)

(72) Inventors: Satoshi Watanabe, Kiryu (JP);
Masahiko Hoshino, Kiryu (JP);
Kimihiko Arakawa, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 185 days.

(21) Appl. No.: 16/738,317

(22) Filed: Jan. 9, 2020

(65) Prior Publication Data

US 2020/0313485 A1 Oct. 1, 2020

(30) Foreign Application Priority Data

Mar. 27, 2019 (JP) .................. JP2019-60117

(51) Int. Cl.
*H02K 3/12* (2006.01)
*H02K 3/34* (2006.01)

(52) U.S. Cl.
CPC .............. *H02K 3/12* (2013.01); *H02K 3/345* (2013.01); *H02K 2203/09* (2013.01)

(58) Field of Classification Search
CPC .................................. H02K 2203/09
See application file for complete search history.

(56) References Cited

U.S. PATENT DOCUMENTS

| | | | | |
|---|---|---|---|---|
| 6,992,417 | B1 * | 1/2006 | Yamada | H02K 3/522 310/194 |
| 8,450,898 | B2 * | 5/2013 | Sears | H02K 3/522 310/194 |
| 8,692,424 | B2 * | 4/2014 | Bohrer | H02K 3/522 310/43 |
| 2010/0289375 | A1 * | 11/2010 | Horng | H02K 3/345 310/216.066 |
| 2011/0193433 | A1 | 8/2011 | Bohrer et al. | |
| 2011/0234031 | A1 | 9/2011 | Kato | |

(Continued)

FOREIGN PATENT DOCUMENTS

| | | |
|---|---|---|
| DE | 102015216698 A1 | 3/2016 |
| JP | 2014-108007 | 6/2014 |

(Continued)

OTHER PUBLICATIONS

Letter from Kroher/Strobel dated Jan. 20, 2021 discussing German Search Report, 2 pages.
German Search Report dated Jan. 4, 2021, 8 pages.

*Primary Examiner* — Robert W Horn

(74) *Attorney, Agent, or Firm* — Rankin, Hill & Clark LLP

(57) ABSTRACT

An insulator includes an extended portion extended along the axial direction of a motor stator from an annular member. The extended portion includes at least one protruding portion protruding in the outer-diameter direction from a guide surface that guides a winding in the circumferential direction of a motor stator. This protruding portion includes an abutting surface capable of abutting the winding guided by the guide surface. The abutting surface includes a slant portion that comes close to the annular member toward the outer-diameter direction. The slant portion is capable of abutting a semicircular portion of the winding with the circular cross-sectional shape at the outer-diameter side.

2 Claims, 4 Drawing Sheets

(56) References Cited

U.S. PATENT DOCUMENTS

| | | | | |
|---|---|---|---|---|
| 2012/0025661 A1* | 2/2012 | Sakane | .................. | H02K 3/522 |
| | | | | 310/215 |
| 2015/0061430 A1 | 3/2015 | Egami et al. | | |
| 2016/0079822 A1* | 3/2016 | Noguchi | .................. | F04D 13/06 |
| | | | | 310/71 |
| 2018/0245597 A1* | 8/2018 | Takarai | .................. | H02K 3/325 |
| 2020/0313485 A1* | 10/2020 | Watanabe | .............. | H02K 3/522 |
| 2020/0313490 A1* | 10/2020 | Watanabe | .............. | H02K 1/146 |
| 2020/0313492 A1* | 10/2020 | Watanabe | .............. | H02K 3/522 |

FOREIGN PATENT DOCUMENTS

| | | |
|---|---|---|
| JP | 5532274 B2 | 6/2014 |
| WO | 2008/027535 A2 | 3/2008 |
| WO | 2017/026412 A1 | 6/2018 |

\* cited by examiner

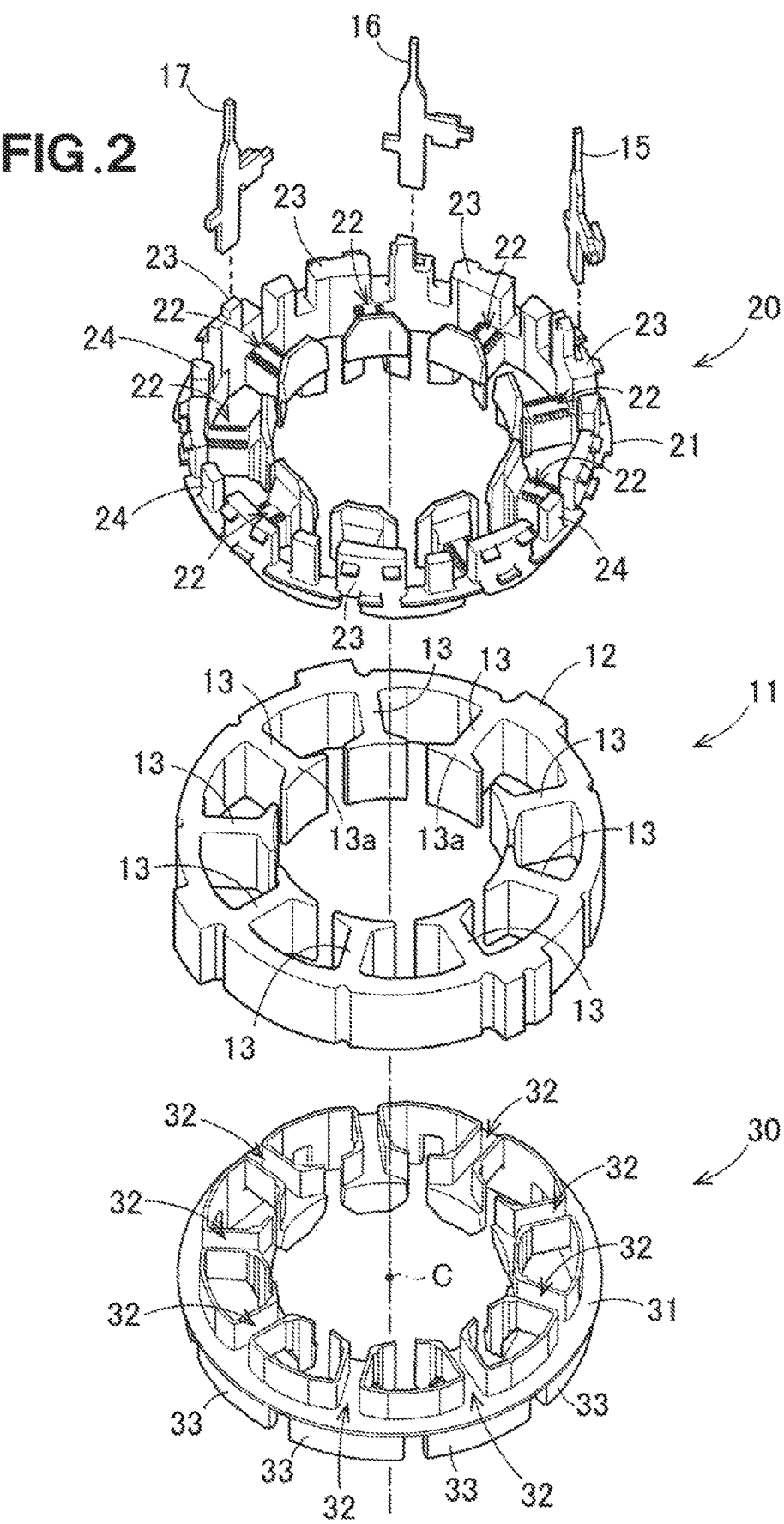

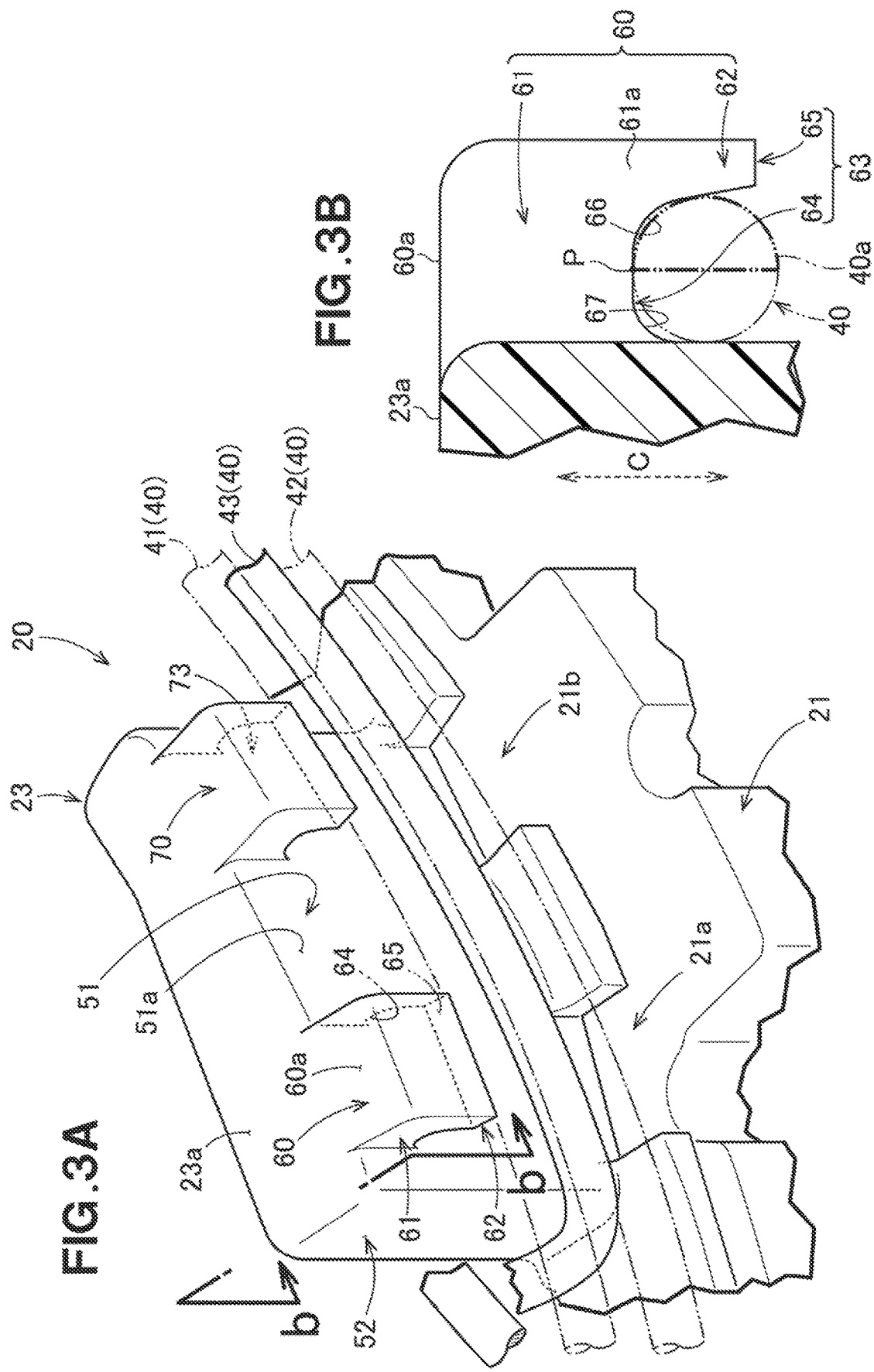

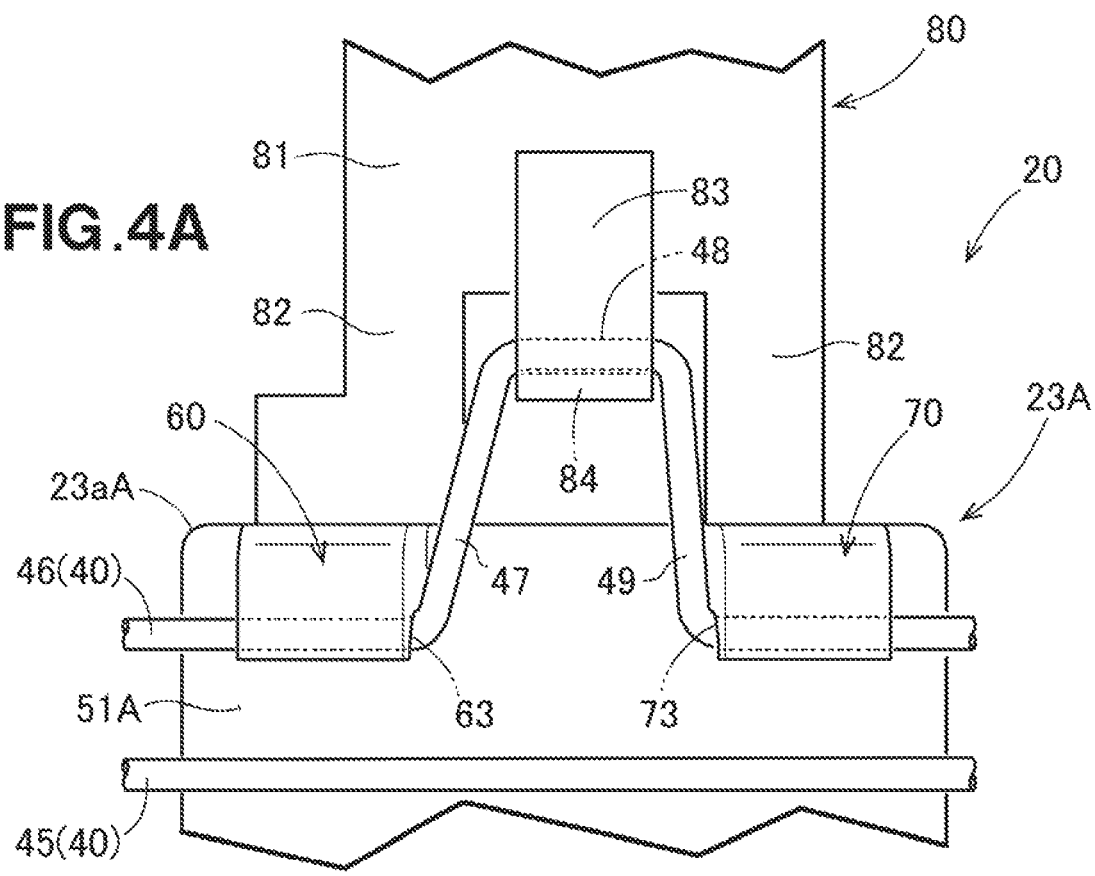
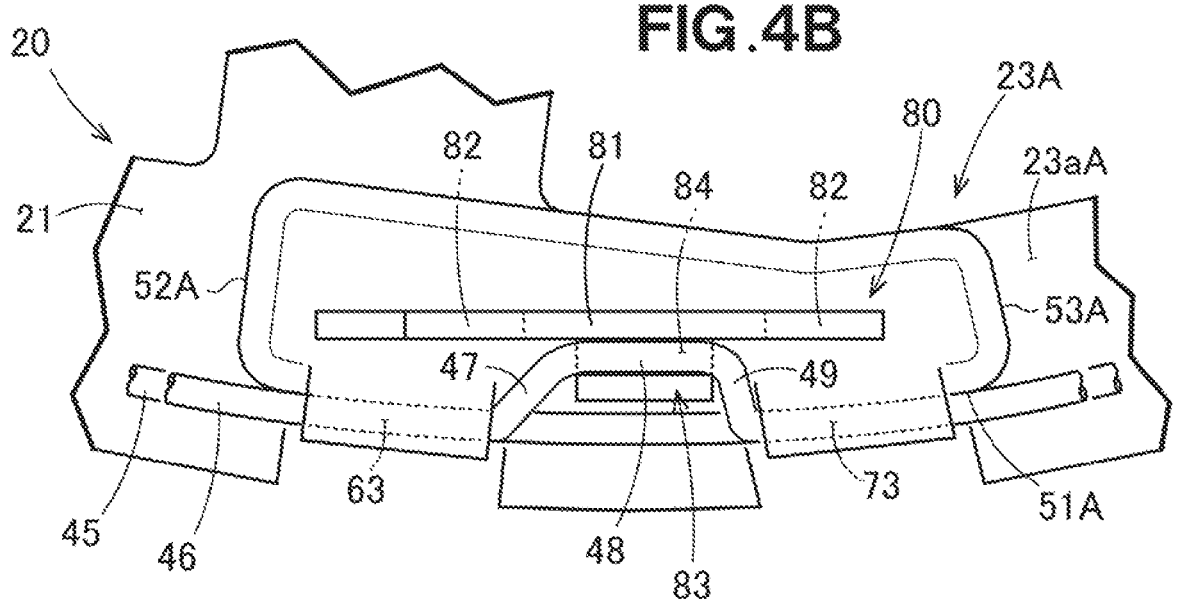

MOTOR STATOR

FIELD OF THE INVENTION

The present disclosure relates to a motor stator that causes a winding to be wound therearound along an outer-circumference surface of an insulator.

BACKGROUND

A motor stator includes a core that is formed by laminating magnetic steel sheets, etc., and an insulator that is attached to this core. Japan Patent No. 5532274 B discloses a conventional technology relating to an insulator.

Japan Patent No. 5532274 B discloses a three-phase and 12-slot motor stator. An insulator of this stator includes an annular member at an outer-diameter side, 12 extended portions extended from this annular member in the axial direction of the motor stator, and 12 wind portions which is extended from the annular member in the inner-diameter direction, and around which a winding is respectively wound.

For the purpose of description, one wind portion among the 12 wind portions will be defined as a first wind portion, and the other wind portions will be defined as, with reference to the center line of the motor stator, second to 12th wind portions in the clockwise direction. Similarly, the extended portion located at the outer-diameter side of the first wind portion will be defined as a first extended portions, and the other extended portions will be defined as second to 12th extended portions in the clockwise direction.

An example wire connection scheme for a winding will be described. First, the winding is wound around the first wind portion. Next, the winding is drawn out to the outer-circumference side of the first extended portion, and the winding is caused to be drawn along the outer-circumference surface (a guide surface) of the second extended portion, and the outer-circumference surface (a guide surface) of the third extended portion. Subsequently, the winding is wound around the fourth wind portion located at the internal-diameter side of the fourth extended portion. Similarly, the winding is wound around the seventh wind portion and the 10th wind portion. Accordingly, formation of the winding in a phase among the three-phases is completed. The winding to the wind portion and drawing along the outer-circumference surface of the extended portion are repeated, and thus formation of the windings in the remaining two phases is completed.

[Patent Document 1] Japan Patent No. 5532274 B

A protruding portion that protrudes in the outer-diameter direction is provided in the outer-circumference surface of each extended portion. When the winding along the guide surface of the extended portion is displaced in the axial direction of the motor stator, the protruding portion restricts the winding so as not to be detached from the extended portion of the insulator.

In order to surely cause the winding to be wound around each wind portion, it is desirable to further enhance a preventing function for the winding from being detached from the extended portion of the insulator.

SUMMARY OF THE INVENTION

An objective of the present disclosure is to provide a technology capable of causing a winding guided in a circumferential direction of an insulator to be retained on a guide surface of the insulator.

A motor stator according to a first embodiment of the present disclosure includes:
a core;
an insulator covering the core; and
a coil formed by a winding wound around the insulator.

The core includes: an annular yoke; and a tooth extended from the yoke in an inner-diameter direction of the motor stator.

The insulator includes: an annular member covering the yoke; a wind portion which covers the tooth and around which the winding is wound; and an extended portion extended from the annular member along an axial direction of the motor stator.

The extended portion includes at least one protruding portion that protrudes in an outer-diameter direction from a guide surface which guides the winding in a circumferential direction of the motor stator.

The protruding portion includes an abutting surface capable of abutting the winding guided by the guide surface.

The abutting surface includes a slant portion that becomes close to the annular member toward the outer-diameter direction.

The slant portion is capable of abutting any portion of a half of the winding at an outer-diameter side.

According to a second embodiment of the present disclosure, preferably, a terminal is attached to a tip surface of the extended portion, the terminal includes a connection portion capable of being electrically connected to the winding guided by the guide surface, the two protruding portions adjacent to each other in the circumferential direction are provided on the guide surface of the extended portion, and as viewed from the axial direction of the motor stator, the connection portion is located between the two protruding portions in the circumferential direction.

According to the above first embodiment, the insulator for the motor stator includes the annular member covering the yoke, and the extended portion extended from the annular member along the axial direction of the motor stator. The extended portion includes at least one protruding portion that protrudes in the outer-diameter direction from the guide surface which guides the winding in the circumferential direction of the motor stator. The protruding portion includes the abutting surface capable of abutting the winding guided by the guide surface. Accordingly, if the winding guided in the circumferential direction is moved in the axial direction, the winding abuts the abutting surface of the protruding portion.

Moreover, the abutting surface includes the slant portion that becomes close to the annular member toward the outer-diameter direction. The slant portion is capable of abutting any portion of the half of the winding at the outer-diameter side. Accordingly, even if the winding is moved in the outer-diameter direction, the winding abuts the abutting surface. In view of the foregoing, even if the winding is moved not only in the axial direction of the motor stator but also in the outer-diameter direction, the winding abuts the abutting surface. This enables the winding to be retained at the predetermined position.

According to the above second embodiment, the terminal which is electrically connectable to the exterior is attached to the tip surface of the extended portion extended from the annular member of the core in the axial direction. The terminal includes the connection portion capable of being electrically connected to the winding. The two protruding portions adjacent to each other in the circumferential direction are provided on the guide surface of the extended portion. As viewed from the axial direction of the motor stator, the connection portion is located between the two protruding portions, and the winding abuts the abutting surface of the one protruding portion, the connection portion, and the other protruding portion.

Accordingly, when the winding guided along the guide surface is connected to the connection portion, by causing the winding to abut the abutting surface of the one protruding portion, the winding can be bent with the one protruding portion being as an origin. Since the bent portion of the winding is held by the one protruding portion, it becomes easy to put the winding across the connection portion. Moreover, the winding extended from the connection portion to the other protruding portion is caught by the other protruding portion. This facilitates subsequent works of guiding the winding in the circumferential direction and of drawing the winding in the inner-diameter direction.

BRIEF DESCRIPTION OF THE DRAWINGS

FIG. 2 is an exploded perspective view of the motor stator illustrated in FIG. 1;
FIG. 3A is a diagram for describing an extended portion of an insulator illustrated in FIG. 2,
and FIG. 3B is a cross-sectional view taken along a line b-b in FIG. 3A;
FIG. 4A is a diagram for describing an extended portion of a motor stator and a terminal thereof according to a second embodiment,
and FIG. 4B is a diagram illustrating the extended portion and the terminal illustrated in FIG. 4A as viewed from the top.

DETAILED DESCRIPTION OF THE EMBODIMENTS

Figure 1:
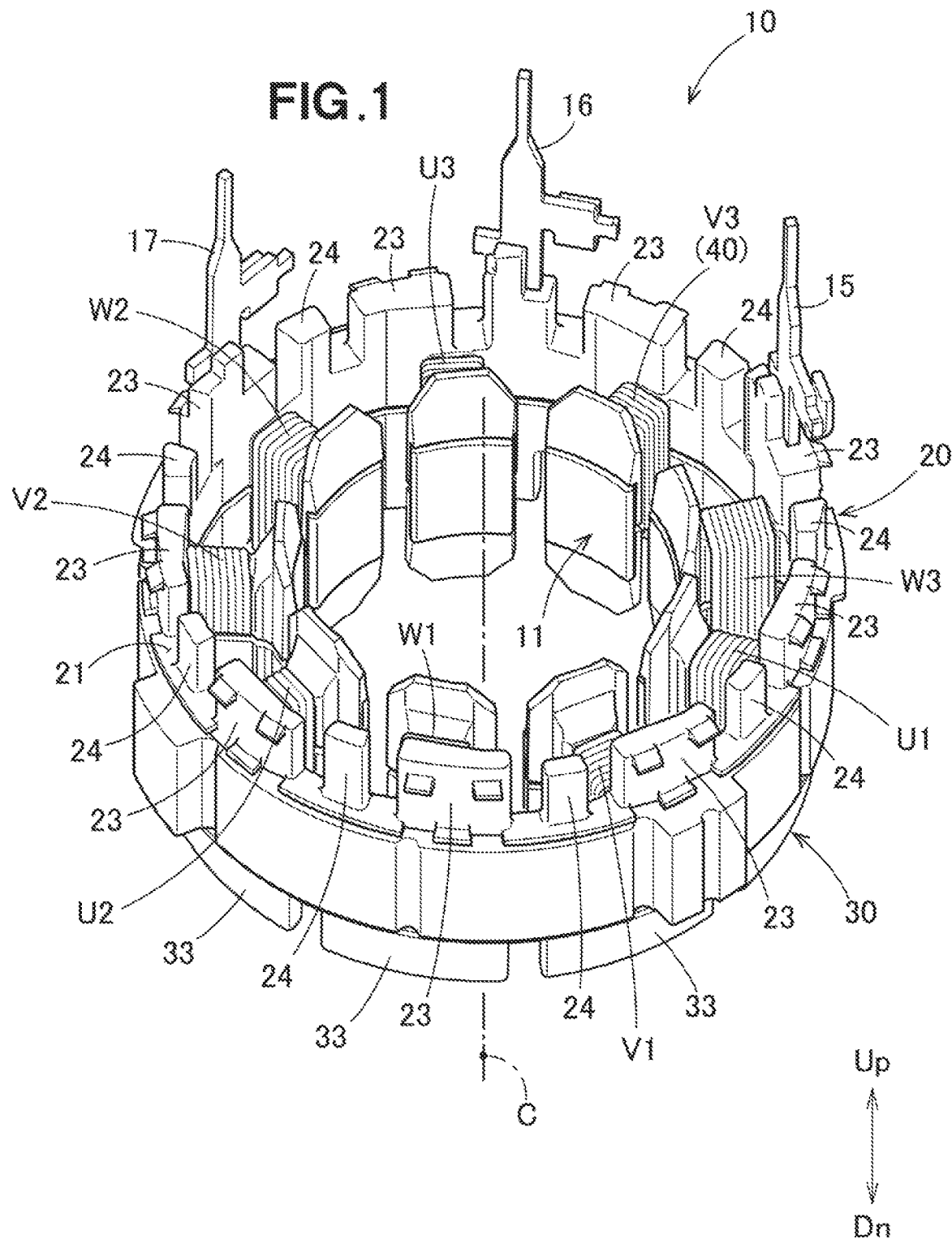
FIG. 1 is a perspective view of a motor stator according to a first embodiment.

Embodiments will be described with reference to the accompanying drawings. Note that, in the following description, an inner-diameter direction, an outer-diameter direction, a circumferential direction, and an axial direction (a vertical direction) will be defined with reference to a center line C of a motor stator. The portion with the same shape will be denoted by the same reference numeral, and the description thereof will be omitted as appropriate.

With reference to FIG. 1 and FIG. 2, a motor stator 10 according to an embodiment includes a core 11 formed of a large number of laminated magnetic steel sheets, a first insulator 20 that covers the upper portion of this core 11, a second insulator 30 that covers the lower portion of the core 11, first coils U1, V1, and W1, second coils U2, V2, and W2, and third coils U3, V3, and W3 which are provided on the first insulator 20 and on the second insulator 30, and a first terminal 15 to a third terminal 17 that are attached to the first insulator 20.

With reference to FIG. 2, the core 11 includes an annular yoke 12, and nine teeth 13 extended the inner-diameter direction from the yoke 12. A tip 13a of each tooth 13 has a width that increases in the circumferential direction along the inner-diameter direction.

The first insulator 20 includes a first annular member 21 capable of covering the upper portion of the yoke 12, nine first wind portions 22 each capable of covering the upper half of each tooth 13, and nine first elongated-wall portions 23 (extended portions) which are extended upwardly from the first annular member 21 along the axial direction, and which are provided intermittently in the circumferential direction, and nine short-wall portions 24 each provided between the adjacent first elongated-wall portions 23, and having a shorter dimension in the circumferential direction than that of the first elongated-wall portion 23.

The second insulator 30 includes a second annular member 31 capable of covering the lower portion of the yoke 12, nine second wind portions 32 each capable of covering the lower portion of each tooth 13, and nine second wall portions 33 extended downwardly along the axial direction from the second annular member 31.

A structure of the first elongated-wall portion 23 located at the outer-diameter side of the coil V1 in the first insulator 20 will be described below.

With reference to FIG. 3A, the first elongated-wall portion 23 includes a first guide surface 51 (a guide surface) that guides three strings of the winding 40 in the circumferential direction, and a second guide surface 52 that guides a string of the winding 40 among the three strings in the inner-diameter direction.

Among the three strings of the winding 40, the upper and lower two winding strings 40 and 40 are drawn out from the one coil among the coil U1 to the coil W3 (see FIG. 1), and are two crossover strings 41 and 42 that are guided by the first guide surface 51 when directed toward the other coil. The winding 40 located between the crossover strings 41 and 42 is a wound string 43 which is drawn out from the one coil among the coil U1 to the coil W3, is guided by the first guide surface 51, is drawn in the inner-diameter direction from the second guide surface 52, and forms the coil V1.

Provided at an upper end 51a of the first guide surface 51 are a first protruding portion 60 and a second protruding portion 70 that protrude in the outer-diameter direction. A dimension of the first protruding portion 60 in the circumferential direction is, for example, substantially ⅓ of the dimension of the circumferential direction of the first guide surface 51. A gap between the first protruding portion 60 and the second protruding portion 70 is, for example, substantially ⅓ of the dimension of the first guide surface 51 in the circumferential direction. Note that the number of the protruding portions may be one, or equal to or greater than three.

A first groove 21a is formed in the annular member 21 below the first protruding portion 60. A second groove 21b is formed in the annular member 21 below the second protruding portion 70.

With reference to FIG. 3A and FIG. 3B, the first protruding portion 60 includes a rectangular main-body portion 61, and a convex portion 62 extended downwardly from a tip 61a of the main-body portion 61 at the outer-diameter side. The main-body portion 61 and the convex portion 62 are formed together. A top surface 60a of the first protruding portion 60 is located on the same plane as a top surface 23a of the first elongated-wall portion 23.

A bottom surface 63 of the first protruding portion 60 is an abutting surface capable of abutting the three strings of the winding 40 guided by the first guide surface 51. The bottom surface 63 (abutting surface) is directed downwardly that is an opposite direction to the upper direction in which the first elongated-wall portion 23 is extended. More specifically, the bottom surface 63 includes a curved portion 64 that is curve so as to expand upwardly, and a flat-surface portion 65 that is located at the outer-diameter side relative to the curved portion 64.

The curved portion 64 includes an external slant portion 66 (a slant portion) that goes downwardly toward the outer-diameter direction from a top point P, and an internal slant portion 67 that goes downwardly toward the inner-diameter direction from the top point P. The external slant portion 66 is a surface capable of abutting a semicircular portion 40*a* (a half portion at the outer-diameter side) at the outer-diameter side in the winding 40 with a circular cross-sectional shape.

Note that the cross-sectional shape of the winding 40 is not limited to a circle, but may be polygonal. Moreover, as illustrated in FIG. 3B, the curved portion 64 may employs a structure that can hold the winding 40 from both sides, or a structure that retains therein the winding 40 without a contact to both ends of the winding 40 (unillustrated).

Furthermore, although the bottom surface 63 includes the two surfaces which are the curved portion 64 and the flat-surface portion 65 according to this embodiment, for example, the bottom surface may be a single flat surface that goes down downwardly toward the outer-diameter direction from the first guide surface 51.

The second protruding portion 70 has the same dimension and shape as those of the first protruding portion 60, and includes a bottom surface 73 capable of abutting the three strings of the winding 40. The description for the other structures of the second protruding portion 70 will be omitted. The first protruding portions 60 and the second protruding portions 70 are also formed in the other respective first elongated-wall portions 23 illustrated in FIG. 1.

Next, advantageous effects of this embodiment will be described.

With reference to FIG. 3B, the first elongated-wall portion 23 includes the first protruding portion 60 that protrudes in the outer-diameter direction from the first guide surface 51. The first protruding portion 60 includes the bottom surface 63 capable of abutting the three strings of the winding 40 that are guided by the first guide surface 51. The bottom surface 63 includes the curved portion 64 and the flat-surface portion 65. Accordingly, when the three strings of the winding 40 guided in the circumferential direction move upwardly, the winding 40 abuts the curved portion 64 or the flat-surface portion 65.

In addition, the curved portion 64 includes the external slant portion 66 that goes down toward the outer-diameter direction from the top point P. The external slant portion 66 is a surface capable of abutting the semicircular portion 40*a* of the winding 40 with the circular cross-sectional shape at the outer-diameter side. Hence, even if it the winding 40 moves in the outer-diameter direction, the winding 40 abuts the external slant portion 66.

As described above, when the winding 40 moves not only upwardly but also in the outer-diameter direction, the winding 40 abuts the bottom surface 63. This enables the winding 40 guided in the circumferential direction to be surely retained at the predetermined position.

Second Embodiment

With reference to FIG. 4A and FIG. 4B, next, a second embodiment will be described. In comparison with the first embodiment, first elongated-wall portions 23A and terminals 80 are different according to the second embodiment.

A dimension of each first elongated-wall portion 23A in the circumferential direction is greater than the dimension of each first elongated-wall portion 23 of first embodiment in the circumferential direction. More specifically, the dimension of the first elongated-wall portion 23A in the circumferential direction is substantially equal to the dimension of a portion of the annular member 21 (see FIG. 2) of the first insulator 20 divided into nine portions in the circumferential direction. The same structure as that of the first embodiment will be denoted by the same reference numeral, and the description thereof will be omitted.

Each first elongated-wall portion 23A includes a first guide surface 51A that guides two strings of the winding 40 in the circumferential direction, and a second guide surface 52A and a third guide surface 53A which are extended in the inner-diameter direction from both ends of the first guide surface 51A, respectively. The second guide surface 52A and the third guide surface 53A are each a guide surface that guides the winding 40 in the inner-diameter direction.

The first guide surface 51A includes a first protruding portion 60 (one protruding portion), and a second protruding portion 70 (another protruding portion). A string extended straightly in the two strings of the winding 40 guided by the first guide surface 51A will be defined as a crossover string 45, and a string which is partially curved and connected to a terminal 80 will be defined as a connection line 46.

The terminal 80 is formed in a thin plate shape that has a thin dimension in the radial direction, and includes a rectangular main-body portion 81, two insertion portions 82 which are extended downwardly from the lower portion of the main-body portion 81, and which are inserted in a top surface 23Aa of the first elongated-wall portion 23A, and a fold-back portion 83 which is located between the two insertion portions 82 and which is folded back upwardly from the lower portion of the main-body portion 61.

The fold-back portion 83 includes a holding portion 84 (a connection portion) that is electrically connected to the connection line 46 by holding the connection line 46. An example connection scheme is fusing.

The connection line 46 abuts the bottom surface 63 of the first protruding portion 60, the holding portion 84, and the bottom surface 73 of the second protruding portion 70. More specifically, the connection line 46 includes a first slant portion 47 that is obliquely extended from the first protruding portion 60 to the holding portion 84, a parallel portion 48 that is extended in parallel with the top surface 23Aa in the holding portion 84, and a second slant portion 49 that is obliquely extended from the lower portion of the fold-back portion 83 to the second protruding portion 70.

The holding portion 84 is located between, in the circumferential direction, the first protruding portion 60 and the second protruding portion 70, and is offset toward the second protruding portion 70. Note that the connection portion 83 is not limited to a case in which it is located within a region between the first protruding portion 60 and the second protruding portion 70, but may be located so as to be out of such a region at the outer-diameter side or at the inner-diameter side.

According to the second embodiment, in addition to the advantageous effects of the first embodiment, the following advantageous effects are accomplishable.

The terminal 80 includes the holding portion 84 that is electrically connected to the connection line 46. As viewed from the top of the motor stator 10 along the axial direction (see FIG. 1), the holding portion 84 is located between the first protruding portion 60 and the second protruding portion 70 that adjoin to each other in the circumferential direction.

Accordingly, when the connection line 46 is connected to the holding portion 84, by causing the winding 40 to abut the bottom surface 63 of the first protruding portion 60, the connection line 46 can be bent with the first protruding portion 60 being as an origin. Since the bent portion of the connection line 46 is caught by the first protruding portion 60, it becomes easy to put the connection line 46 across the holding portion 84. Moreover, the winding drawn toward the second protruding portion 70 from the holding portion 84 is caught by the second protruding portion 70. This facilitates subsequent works of guiding the connection line 46 in the circumferential direction and of drawing the winding in the inner-diameter direction.

What is claimed is:
1. A motor stator comprising:
a core;
an insulator covering the core; and
a coil formed by a winding wound around the insulator,
wherein the core comprises: an annular yoke; and a tooth extended from the yoke in an inner-diameter direction of the motor stator,
wherein the insulator comprises: an annular member covering the yoke; a wind portion which covers the tooth and around which the winding is wound; and an extended portion extended from the annular member along an axial direction of the motor stator,
wherein the extended portion comprises at least one protruding portion that protrudes in an outer-diameter direction from a guide surface which guides the winding in a circumferential direction of the motor stator,
wherein the protruding portion comprises an abutting surface capable of abutting the winding guided by the guide surface,
wherein the abutting surface comprises a slant portion that becomes close to the annular member toward the outer-diameter direction, and
wherein the slant portion is capable of abutting any portion of a half of the winding at an outer-diameter side.
2. The motor stator according to claim 1, wherein:
a terminal is attached to a tip surface of the extended portion;
the terminal comprises a connection portion capable of being electrically connected to the winding guided by the guide surface;
the two protruding portions adjacent to each other in the circumferential direction are provided on the guide surface of the extended portion; and
as viewed from the axial direction of the motor stator, the connection portion is located between the two protruding portions in the circumferential direction.

* * * * *